US006496138B1

(12) United States Patent
Honma

(10) Patent No.: US 6,496,138 B1
(45) Date of Patent: Dec. 17, 2002

(54) ELECTROMAGNETIC WAVE RADAR DEVICE MOUNTED ON A CAR

(75) Inventor: Shinichi Honma, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/095,650

(22) Filed: Jun. 11, 1998

(30) Foreign Application Priority Data

Feb. 10, 1998 (JP) ............................................ 10-028550

(51) Int. Cl.⁷ ................................................ G01S 13/93
(52) U.S. Cl. ............................ 342/70; 342/27; 342/71; 343/711; 343/712; 343/713; 343/872; 343/873; 343/907; 343/909; 343/910; 343/911 R
(58) Field of Search ................................. 342/5, 11, 24, 342/27, 28, 61, 70, 71, 72, 195, 165; 343/705, 711, 712–717, 872, 873, 878, 879, 907, 909, 910, 911 R, 911 L

(56) References Cited

U.S. PATENT DOCUMENTS 3,794,997 A * 2/1974 Iwatsuki et al. .............. 342/72
5,485,159 A * 1/1996 Zhang et al. ................ 342/165
5,717,399 A * 2/1998 Urabe et al. .................. 342/70

FOREIGN PATENT DOCUMENTS

| DE | 25 00 120 A1 | 8/1975 |
| DE | 197 12 098 A1 | 5/1998 |
| EP | 0 575 814 A1 | 12/1993 |
| GB | 2 287 917 | 10/1995 |

OTHER PUBLICATIONS

"Micro–Wave and Milli–Wave Antennas and Peripheral Technology", 1993, pp. 474–477, Tokyo, (In Japanese).
"Draft for Symposium for Using Electromagnetic Waves; Promoting Use of Micro–Waves and Milli–Waves in the 21st Century", Jun. 1990, p. 111, Tokyo, (In Japanese).
"Antenna Engineering Handbook", Electronic Information and Communication Institute Compilation, 1988, pp. 359–360, Japan, (In Japanese).

* cited by examiner

Primary Examiner—Bernarr E. Gregory
(74) Attorney, Agent, or Firm—Sughrue, Mion, Zinn, Macpeak & Seas, PLLC

(57) ABSTRACT

An electromagnetic wave radar device mounted on a car, which helps improve external appearance of a car without impairing radar function, and is fabricated using a decreased number of parts at a reduced cost. The electromagnetic wave radar device comprises an electromagnetic wave radar body 1 mounted on a car 2 and for transmitting and receiving electromagnetic waves of a predetermined frequency, and a radome portion made of a material which permits the electromagnetic waves to transmit through and covers the electromagnetic radar body, the electromagnetic wave radar body being disposed on the side of the back surface 30A of the bumper 30 of the car, and the radome portion being formed by a portion of the bumper of the car.

15 Claims, 10 Drawing Sheets

ELECTROMAGNETIC WAVE RADAR DEVICE MOUNTED ON A CAR

BACKGROUND OF THE INVENTION

1. Field of the Invention

The present invention relates to an electromagnetic wave radar device mounted on a car, which helps improve external appearance of a car without impairing radar function, and is fabricated using a decreased number of parts at a reduced cost.

2. Prior Art

An electromagnetic wave radar device has heretofore been used as an obstacle sensor being mounted on a car.

The device of this kind has been disclosed in, for example, "Antenna for Microwaves/Millimeter Waves and Peripheral Technology", Nov. 21, 1993, issued by Mimatsu Data System, pp. 474–477, "Symposium on Utilizing Electromagnetic Waves, Preliminary Papers on Promoting the Utilization of Quasi-Microwaves/millimeter waves", June, 1990, issued by, Foundation, Electromagnetic Wave System Development Center, p. 111), and "Handbook of Antenna Engineering", Oct. 30, 1980, edited by the Academy of Electronic Data Communication, issued by Ohm Co., pp. 359–361.

FIG. 17 is a perspective view showing the appearance of a conventional electromagnetic wave radar device mounted on a car disclosed in the above-mentioned literature "Antenna for Microwaves/Millimeter Waves and Peripheral Technology", p. 477.

In FIG. 17, an electromagnetic wave radar body 1 mounted on a car is provided on an upper part of a bumper 3 of a vehicle 2 and is disposed at a central part of a front grille 4.

The electromagnetic wave radar body 1 is directly disposed on a front part of the vehicle 2, or is disposed in an opening formed in the front grille 4, emits electromagnetic waves of a predetermined frequency as a transmission beam W1 toward the front of the vehicle 2, and receives the electromagnetic waves reflected by an obstacle (not shown) as a reception beam W2.

A transmission/reception antenna in the electromagnetic wave radar body 1 is located on the travelling side of the vehicle 2, and is covered by a known radome (not shown) made of a material which permits the electromagnetic waves to pass through in order to prevent the antenna from the external damaging factors such as rain, dust and dirt and to prevent its performance from being deteriorated.

According to the device disclosed in the above-mentioned literature "Handbook of Antenna Engineering", an opening (not shown) is formed in the bumper 3, and the electromagnetic wave radar body 1 is disposed in the opening.

According to the conventional electromagnetic wave radar devices mounted on the car as described above, an opening wider than an area corresponding to the transmission/reception antenna is formed in the bumper 3 or in the front grille 4 in order to mount the electromagnetic radar body 1 on the car 2.

However, forming an opening in the bumper 3 or in the grille 4 imposes a limitation on designing the appearance of the car 2.

Moreover, despite the electromagnetic wave radar body 1 is disposed at the back of the opening in the front grille 4 so will not to deteriorate the appearance of the car 2, the pattern of the transmission/reception electromagnetic waves is affected by the front grille 4 irrespective of the material (metal or dielectric) of the front grille 4, causing the object-detecting performance of the electromagnetic radar body 1 to be greatly deteriorated.

In order to accomplish both the electric performance of the electromagnetic wave radar body 1 and the designing of appearance of the car 2, therefore, limitation is imposed on a place for installing the electromagnetic wave radar device 1.

In either device disclosed in the above-mentioned literatures, furthermore, a separate radome is necessary for protecting the electromagnetic wave radar body 1.

In the conventional electromagnetic wave radar devices mounted on the vehicles as described above, the opening must be formed in the bumper 3 or in the grille 4 for installing the electromagnetic wave radar body 1, leaving a problem of impairing the appearance of the car 2.

When the electromagnetic wave radar body 1 is installed on a portion of the front grille 4, furthermore, the radar function is impaired being affected by the grille member.

Besides, a separate radome must be provided to protect the electromagnetic wave radar body 1 from the external environment, resulting in an increase in the number of parts and in an increase in the cost.

SUMMARY OF THE INVENTION

The present invention is directed to an electromagnetic wave radar device mounted on a car at a reduced cost, by using the bumper as a radome portion deteriorating neither the radar function nor the appearance of the car, and using a decreased number of parts by giving attention to the fact that the bumper of a car is made of a dielectric.

An electromagnetic wave radar device mounted on a car according to the present invention comprises an electromagnetic wave radar body mounted on a car and for transmitting and receiving electromagnetic waves of a predetermined frequency, and a radome portion made of a material which permits the electromagnetic waves to transmit through and covers the electromagnetic radar body, the electromagnetic wave radar body being disposed on the back surface side of the bumper of the car, and the radome portion being formed by a portion of the bumper of the car.

In the electromagnetic wave radar device mounted on a car according to the present invention, when a relative permittivity of the bumper is denoted by $\epsilon c$, an angle of incidence of the electromagnetic waves relative to the bumper by $\theta i$, a natural number by n, and a wavelength of the electromagnetic waves in free space by $\lambda o$, then, a thickness tc of the radome portion in the bumper is set to a value that satisfies the following formula, $$tc = n \cdot \lambda o / \left\{ 2\sqrt{(\epsilon c - \sin^2 \theta i)} \right\}.$$

In the electromagnetic wave radar device mounted on a car according to the present invention, furthermore, the radome portion in the bumper has a dielectric lens portion for focusing the electromagnetic waves.

In the electromagnetic wave radar device mounted on a car according to the present invention, the dielectric lens portion is constituted by a thick portion that is formed in the bumper integrally together.

In the electromagnetic wave radar device mounted on a car according to the present invention, the dielectric lens portion is secured to a portion on the back surface of the bumper and is constituted integrally with the bumper.

In the electromagnetic wave radar device mounted on a car according to the present invention, the dielectric lens portion is inserted in the opening of the bumper and is constituted integrally with the bumper.

In the electromagnetic wave radar device mounted on a car according to the present invention, the radome portion in the bumper has a polarizer unit for transforming linear polarization and circular polarization relative to each other, and the polarizer unit has corrugated grooves.

In the electromagnetic wave radar device mounted on a car according to the present invention, furthermore, when a phase constant in a medium of the electromagnetic waves transmitting through the polarizer unit is denoted by $\beta m$, a phase constant of the electromagnetic waves in free space by $\beta o$ and a natural number by n, then, a depth d of the corrugated grooves is set to a value that satisfies the following formula, $$|\beta m - \beta o| d = (2n-1)\pi/2.$$

In the electromagnetic wave radar device mounted on a car according to the present invention, the polarizer unit is formed in the bumper integrally together.

In the electromagnetic wave radar device mounted on a car according to the present invention, the polarizer unit is secured to a portion on the back surface of the bumper and is constituted integrally with the bumper.

In the electromagnetic wave radar device mounted on a car according to the present invention, the polarizer unit is inserted in the opening in the bumper and is constituted integrally with the bumper.

In the electromagnetic wave radar device mounted on a car according to the present invention, the radome portion in the bumper is coated with a coating material in a predetermined thickness, the coating material being composed of a material which permits the electromagnetic waves to transmit through.

In the electromagnetic wave radar device mounted on a car according to the present invention, furthermore, the coating material is applied onto at least either the front surface or the back surface of the radome portion of the bumper and, when a relative permittivity of the bumper is denoted by $\epsilon c$, a relative permittivity $\epsilon s$ of the coating material is set to a value that satisfies the following formula, $$\epsilon c = \epsilon s^2.$$

and, when a natural number is denoted by n and a wavelength of the electromagnetic waves in free space by $\lambda o$, a thickness ts of the coating material is set to a value that satisfies the following formula, $$ts = \{(2n-1)/4\} \cdot \lambda o / \sqrt{\epsilon s}.$$

In the electromagnetic wave radar device mounted on a car according to the present invention, furthermore, the radome portion in the bumper has a central portion which is directly related to transmitting and receiving the electromagnetic waves, and a peripheral portion surrounding the central portion, the peripheral portion being coated with an radiowave absorber on the side of the back surface thereof that faces the electromagnetic wave radar body.

DESCRIPTION OF THE PREFERRED EMBODIMENTS

Embodiment 1.

Figure 1:
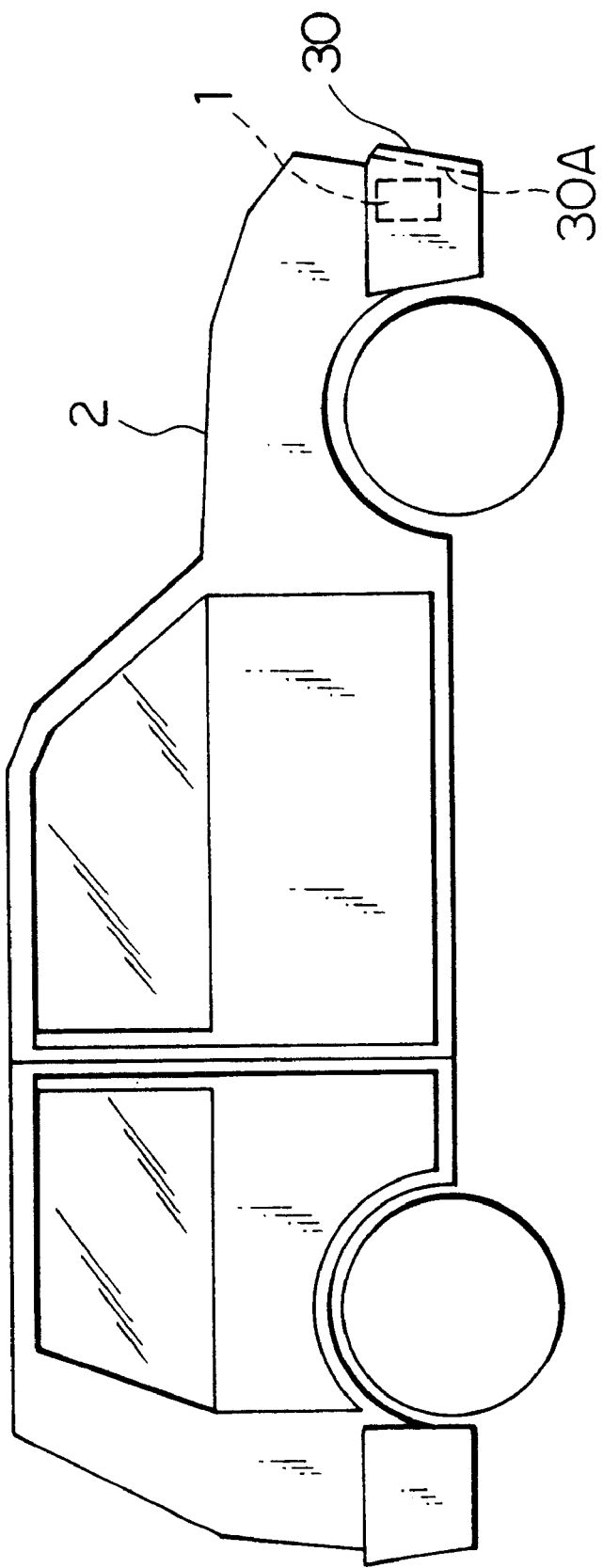
FIG. 1 is a side view illustrating an apparatus according to an embodiment 1 of the present invention.
Figure 2:
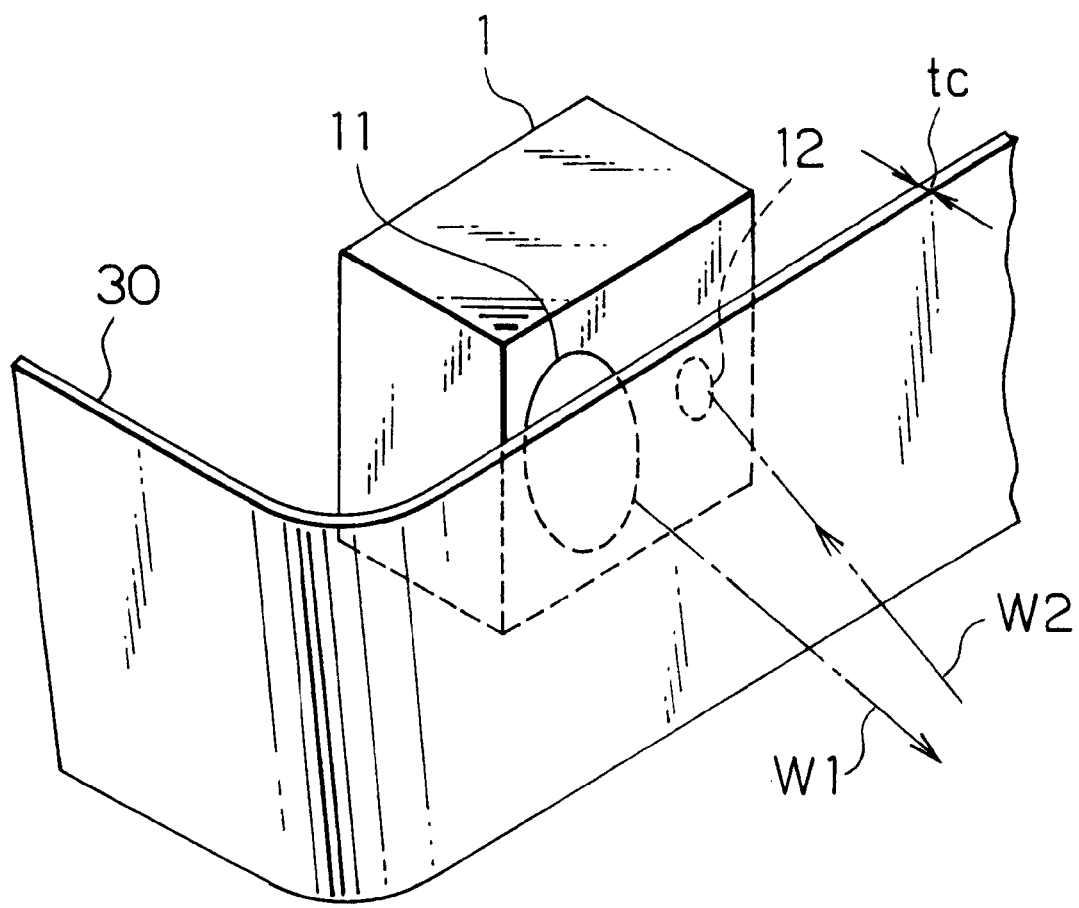
FIG. 2 is a perspective view illustrating, on an enlarged scale, a major portion according to the embodiment 1 of the present invention.

An embodiment 1 of the invention will now be described with reference to the drawings. FIG. 1 is a side view illustrating the appearance of the embodiment 1 of the present invention, and FIG. 2 is a perspective view illustrating, on an enlarged scale, a major portion in FIG. 1.

Figure 17:
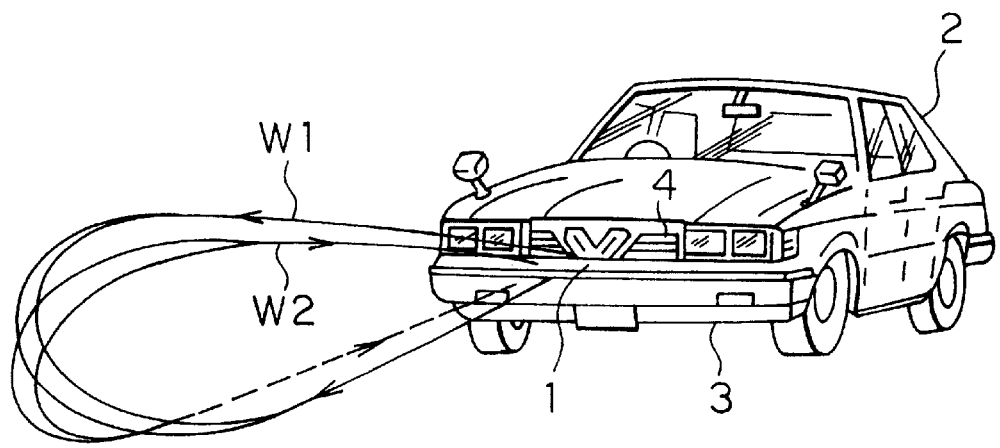
FIG. 17 is a perspective view illustrating the appearance of a conventional electromagnetic wave radar device mounted on a car.

In the drawings, the same portions as those described above (see FIG. 17) are denoted by the same reference numerals but their description is not repeated.

In this case, an electromagnetic wave radar body 1 is disposed on the side of the back surface 30A of a bumper 30, part of the bumper 30 serving as a radome portion of the electromagnetic wave radar body 1.

The electromagnetic radar body 1 has an antenna 11 for transmission and an antenna 12 for reception, but may have a single antenna for transmission and reception.

In the bumper 30, the radome portion working at least as a radome is made of a dielectric which permits the electromagnetic waves to transmit through.

When a relative permittivity of the bumper 30 is denoted by $\epsilon c$, an angle of incidence of the electromagnetic waves (beam W1 or W2) relative to the bumper 30 by $\theta i$, a natural number by n (=1, 2, 3, . . . ), and a wavelength of the electromagnetic waves in free space by $\lambda o$, then, a thickness tc of the radome portion in the bumper is set to a value that satisfies the following formula (1), $$tc = n \cdot \lambda o / \left\{ 2\sqrt{(\varepsilon c - \sin^2 \theta i)} \right\}.$$

The formula (1) can be derived from, for example, the content described on page 2 of "Radome" (Technical Report of Mitsubishi Denki Co., Vol. 29, No. 7 (July), by Takashi Kitsuregawa), p. 2.

When the speed of light is denoted by C and a predetermined frequency of electromagnetic waves by f, then, the wavelength λo in free space in the formula (1) is expressed by the following formula (2), $$\lambda o = C/f \qquad (2)$$

Since the electromagnetic waves are radiated nearly perpendicularly to the surface of the bumper 30, the angle of incidence θi can be regarded to be almost 0°. Therefore, the formula (1) can be approximated by the following formula (3), $$tc \approx n \cdot \lambda o / \{2\sqrt{\varepsilon c}\} \qquad (3)$$

Upon suitably selecting the thickness tc of the bumper 30 as given by the formula (1) or (3), the radome portion of the bumper 30 works as a radome of a half wavelength exhibiting transmission characteristics of a very low loss for the electromagnetic waves that are used.

There the electromagnetic wave radar body 1 may be disposed behind the back surface 30A of the bumper 30, offering an increased degree of freedom for designing the appearance of the car 2.

That is, since there is no need of forming an opening in the front part of the car 2, installation of the electromagnetic wave radar body 1 does not at all impair the appearance.

Since it is allowed to use a relatively wide space on the back surface side of the bumper 30, the type of the antennas 11 and 12 can be freely selected without any limitation from the standpoint of design.

Moreover, since there is no need of providing a separate radome, the number of parts can be decreased, the dielectric layer is only that of the bumper 30, and the transmission characteristics of the electromagnetic waves can be improved.

Embodiment 2.

In the above-mentioned embodiment 1, the thickness tc of the radome portion of the bumper 30 is set to an optimum value depending upon a predetermined frequency f. When the requirement for the transmission characteristics of the electromagnetic waves is not so strict, however, the thickness tc of the bumper 30 may be arbitrarily selected.

Embodiment 3.

In the above-mentioned embodiment 1, the radome portion of the bumper 30 is formed maintaining a predetermined thickness tc to accomplish good electromagnetic wave transmission characteristics. It is, however, also allowable to add other effective functions to the radome portion of the bumper 30.

Figure 3:
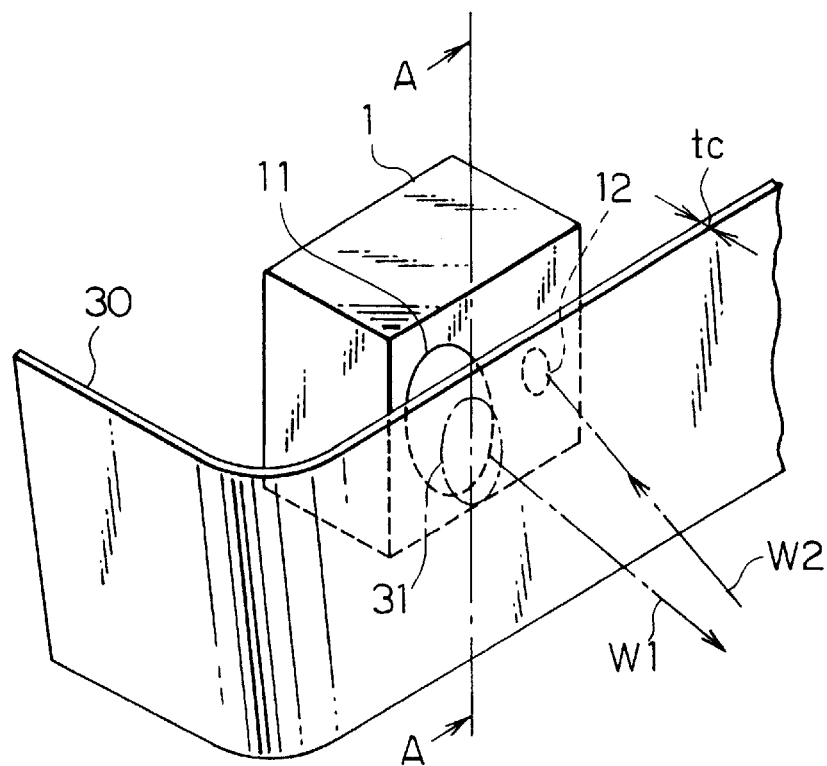
FIG. 3 is a perspective view illustrating a major portion according to an embodiment 3 of the present invention.
Figure 4:
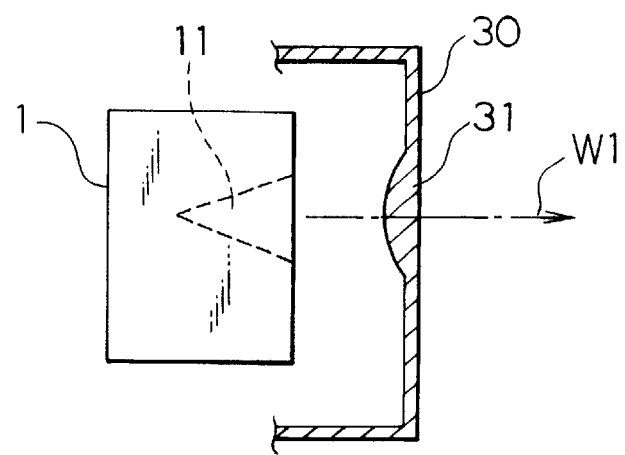
FIG. 4 is a side sectional view along the line A—A in FIG. 7.

FIG. 3 is a perspective view illustrating a major portion of an embodiment 3 of the present invention in which a focusing lens function is added to the radome portion of the bumper 30, and FIG. 4 is a side sectional view along the line A—A in FIG. 3.

In these drawings, the same portions as those described above (see FIG. 2) are denoted by the same reference numerals but their description is not repeated.

In this case, a dielectric lens portion 31 for focusing the electromagnetic waves is formed in the radome portion of the bumper 30.

Referring to FIG. 4, furthermore, the dielectric lens portion 31 is constituted by a thick portion integrally formed on the bumper 30.

Upon forming the dielectric lens portion 31 on the bumper 30 as described above, the transmission beam W1 transmitted from the transmission antenna 11 is focused to become highly directive. Therefore, the electromagnetic wave radar body 1 exhibits markedly improved target-detecting performance.

Upon changing the lens characteristics, furthermore, the radiation characteristics of the transmission beam W1 can be freely controlled.

The dielectric lens portion 31 is formed integrally with the bumper 30 by molding the resin at the time of producing the bumper 30. Therefore, the lens function is easily added to the radome portion of the bumper 30 without increasing the number of steps of production or without increasing the cost.

In FIG. 3, the dielectric lens portion 31 is provided for the side of the transmission antenna 11 only. It is, however, also allowable to provide a dielectric lens portion (not shown) for the side of the reception antenna 12, too, in order to focus the reception beam W2, too.

It needs not be pointed out that the same dielectric lens portion can be formed even in the case of the transmission/reception antenna of an integral form in which the transmission antenna 11 further works as the reception antenna 12.

The thickness tc of the radome portion of the bumper 30 through which the electromagnetic waves transmit is changed as shown in FIG. 4, and the dielectric lens portion 31 having the shape of a convex lens in cross section is formed to accomplish the lens function. It is, however, also allowable to substantially accomplish the lens function by partly changing the relative permittivity of the dielectric lens portion 31 instead of changing the sectional shape.

Embodiment 4.

In the above-mentioned embodiment 3, the dielectric lens portion 31 is formed by molding the resin integrally with the bumper 30. However, a separately formed dielectric lens portion may be attached to the radome portion of the bumper 30.

Figure 5:
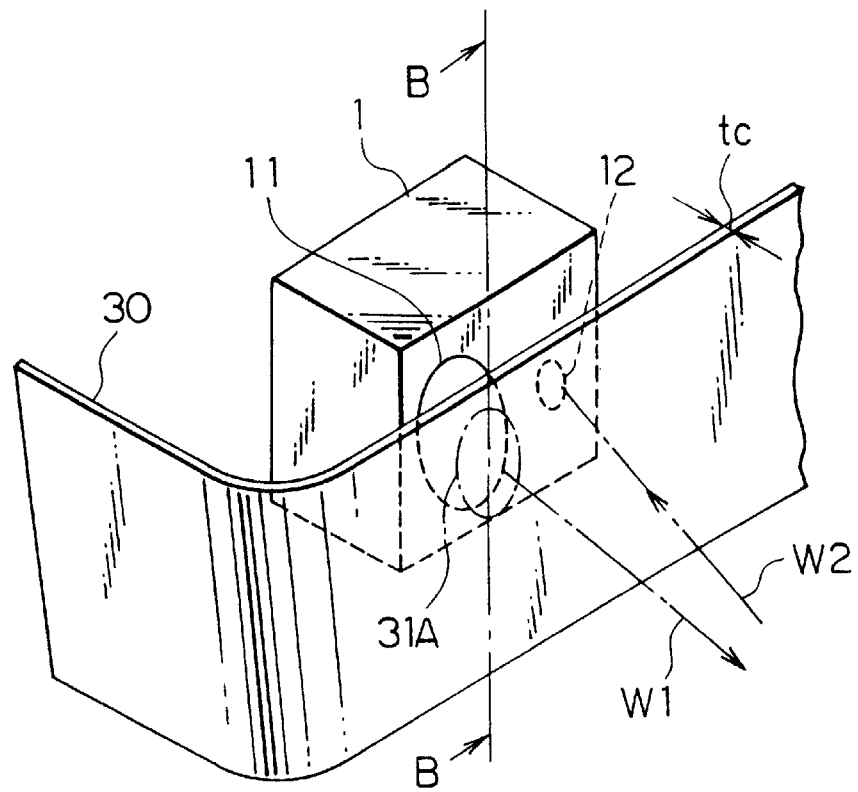
FIG. 5 is a perspective view illustrating a major portion according to an embodiment 4 of the present invention.
Figure 6:
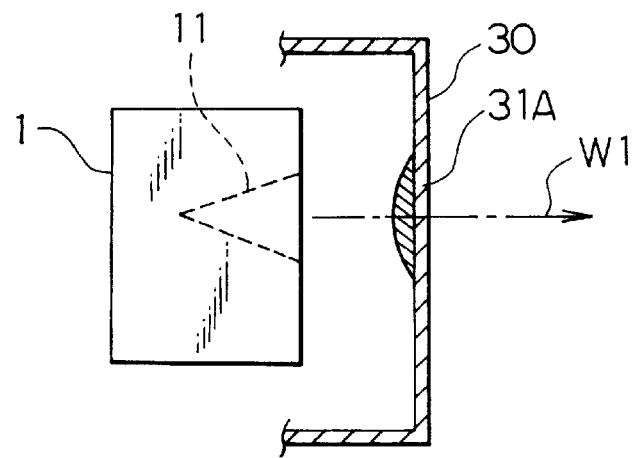
FIG. 6 is a side sectional view along the line B—B in FIG. 7.

FIG. 5 is a perspective view illustrating a major portion of an embodiment 4 of the present invention in which a separately formed dielectric lens portion is attached to the bumper 30, and FIG. 6 is a side sectional view along the line B—B in FIG. 5.

In these drawings, the same portions as those described above (see FIGS. 3 and 4) are denoted by the same reference numerals but their description is not repeated.

In this case, the dielectric lens portion 31A is attached to the radome portion of the bumper 30 to accomplish the same lens function as the one described above.

According to the constitution of FIG. 6, the position for attaching the dielectric lens portion 31A can be adjusted depending upon the position of the antenna 11 or 12 at the time of assembling the dielectric lens portion 31A, and the material of the dielectric lens portion 31A can be freely selected irrespective of the material of the bumper 30.

Embodiment 5.

In the above-mentioned embodiment 4, the dielectric lens portion 31A is attached to the bumper 30 to accomplish the lens function. It is, however, also allowable to form an opening in the radome portion of the bumper 30, and insert a separate dielectric lens portion in the opening and attach it integrally together.

Figure 7:
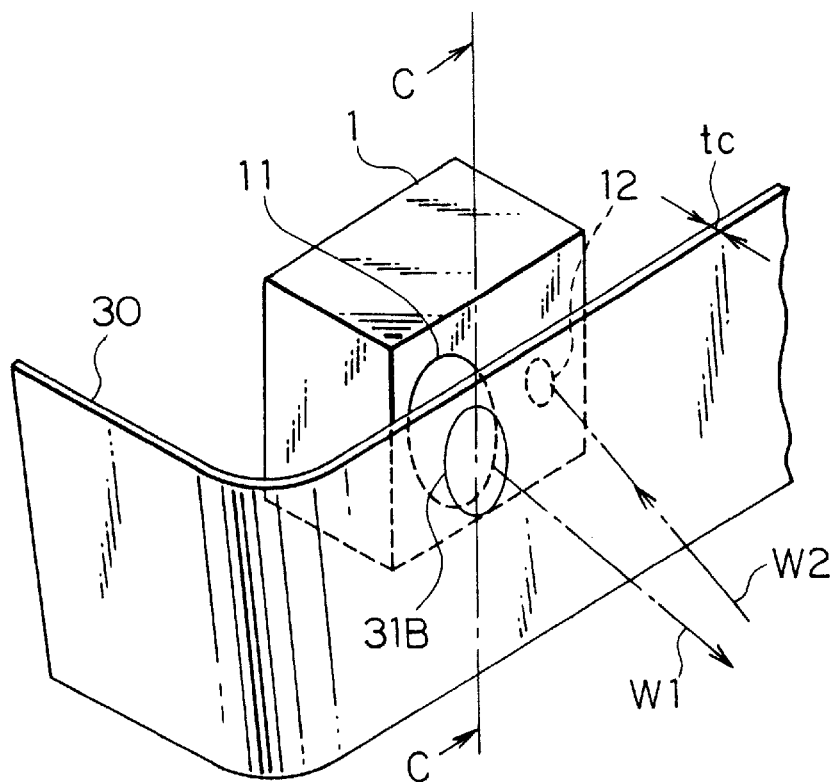
FIG. 7 is a perspective view illustrating a major portion according to an embodiment 5 of the present invention.
Figure 8:
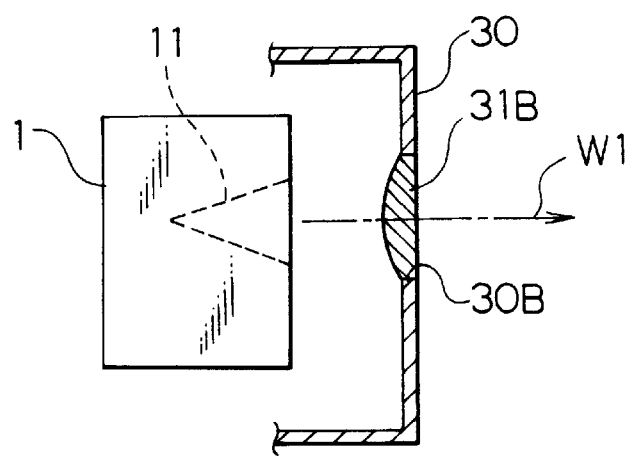
FIG. 8 is a side sectional view along the line C—C in FIG. 7.

FIG. 7 is a perspective view illustrating a major portion of an embodiment 5 of the present invention in which a separate dielectric lens portion is inserted in a portion of the bumper 30, and FIG. 8 is a side sectional view along the line C—C in FIG. 7.

In these drawings, the same portions as those described above (see FIGS. 5 and 6) are denoted by the same reference numerals but their description is not repeated.

In this case, an opening 30B is formed in the radome portion of the bumper 30, and a separate dielectric lens portion 31B is inserted in the opening 30B.

The dielectric lens portion 31B is attached to the bumper 30 integrally together through the opening 30B to accomplish the same lens function as the one described above.

According to the constitution of FIG. 8, the material of the dielectric lens portion 31B can be freely selected irrespective of the material of the bumper 30.

Moreover, the lens function is accomplished by the dielectric lens portion 31B alone without at all affected by the material of the bumper 30, making it possible to highly precisely adjust the characteristics for focusing the electromagnetic waves (transmission beam W1 or reception beam W2) that transmit through.

The dielectric lens portion 31B is in flush with the outer surface of the bumper 30. By applying a coating material onto the outer side of the bumper 30, therefore, the dielectric lens portion 31B is not perceived from the outer side and does not deteriorate the appearance.

Embodiment 6.

In the above-mentioned embodiments 3 to 5, the lens function is added to the radome portion of the bumper 30. It is, however, also allowable to add a further function such as polarization transforming function.

Figure 9:
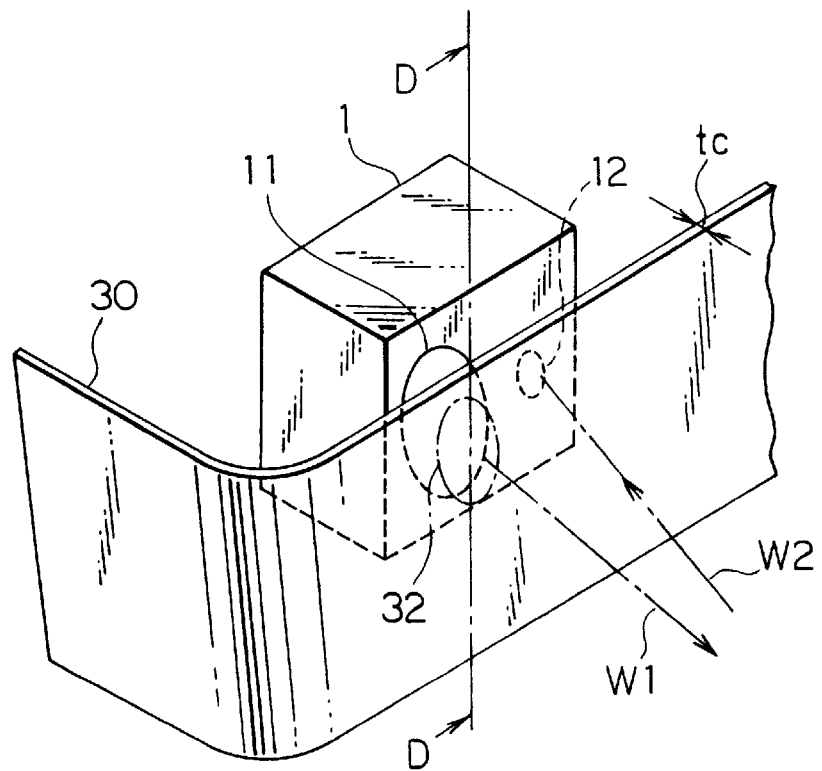
FIG. 9 is a perspective view illustrating a major portion according to an embodiment 6 of the present invention.
Figure 10:
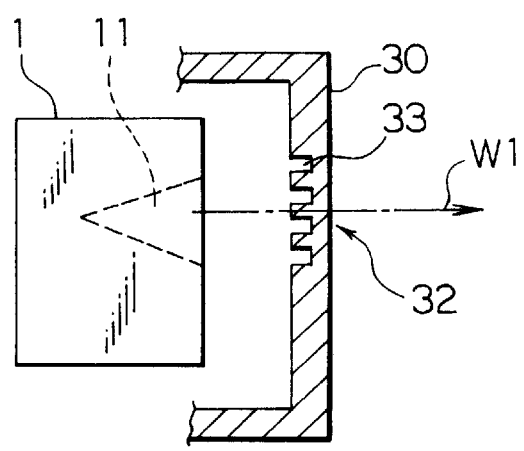
FIG. 10 is a side sectional view along the line D—D in FIG. 9.

FIG. 9 is a perspective view illustrating a major portion of an embodiment 6 of the present invention in which the polarization transforming function is added to a portion of the bumper 30, and FIG. 10 is a side sectional view along the line D—D in FIG. 9.

In these drawings, the same portions as those described above (see FIGS. 7 and 8) are denoted by the same reference numerals but their description is not repeated.

In this case, a polarizer unit 32 is formed in the radome portion of the bumper 30 to transform linear polarization and circular polarization relative to each other, the polarizer unit 32 having a plurality of corrugated grooves 33 arranged in parallel.

Figure 11:
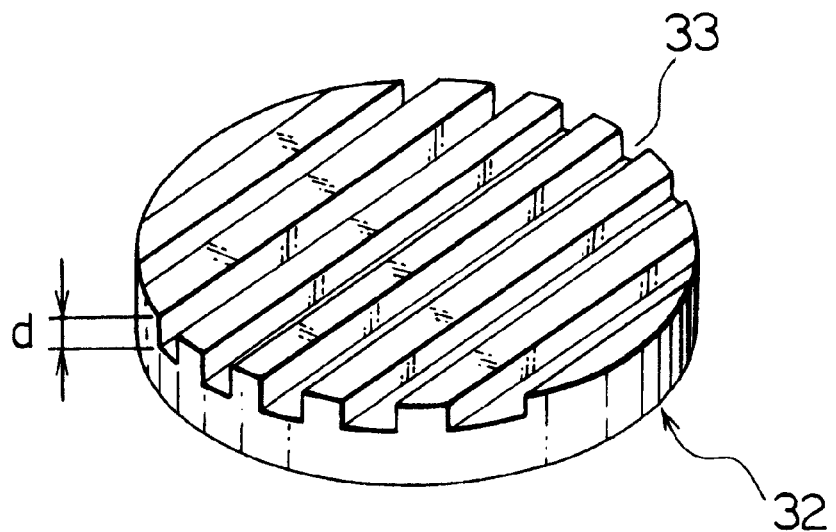
FIG. 11 is a perspective view illustrating, on an enlarged scale, a polarizer unit in FIG. 10.

FIG. 11 is a perspective view illustrating, on an enlarged scale, the polarizer unit 32 and the corrugated grooves 33 in FIG. 10.

In FIG. 11, the depth d of the corrugated grooves 33 in the polarizer unit 32 is set to a value which satisfies, for example, the following formula (4), $$|\beta m - \beta o| d = (2n-1)\pi/2 \tag{4}$$

wherein βm denotes a phase constant in a medium, βo denotes a phase constant in free space, and βo is expressed by the following formula (5) by using the above-mentioned wavelength λo in free space, $$\beta o = 2\pi/\lambda o \tag{5}$$

The above-mentioned formula (4) can be derived from, for example, the contents disclosed in "Electromagnetic Wave Engineering", May 10, 1995, Corona Co., by Nozomu Hasebe, pp. 98–101 or "ANTENNAS Second Edition", 1988, McGraw-Hill Book Co., by John D. Kraus, pp. 732–734.

In the case of FIG. 10, the polarizer unit 32 is formed by molding a resin integrally with the bumper 30.

By providing the polarizer unit 32 constituted by corrugated grooves 33 in a portion of the bumper 30 through which the electromagnetic waves (transmission beam W1 or reception beam W2) transmit through as described above, it is made possible to easily add the polarization transforming function to the radome portion of the bumper 30 in order to transform linear polarization and circular polarization relative to each other.

In general, it is relatively easy to impart linear polarization to the electromagnetic waves but it is not easy to impart circular polarization. By forming the polarizer unit 32 constituted by the corrugated grooves 33, however, it is allowed to easily impart the circular polarization and to expand the function and use of the electromagnetic wave radar device.

Embodiment 7.

In the above-mentioned embodiment 6, the polarizer unit 32 is formed by molding the resin integrally with the bumper 30. It is, however, also possible to attach a separate polarizer unit to the radome portion of the bumper 30.

Figure 12:
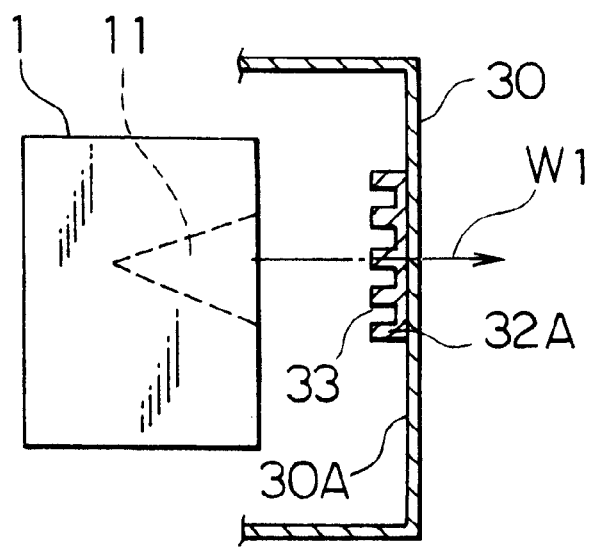
FIG. 12 is a side sectional view illustrating a major portion according to an embodiment 7 of the present invention.

FIG. 12 is a side sectional view illustrating a major portion of the embodiment 7 of the invention in which a separate polarizer unit is attached to the bumper 30, and wherein the same portions as those described above (see FIG. 10) are denoted by the same reference numerals but their description is not repeated.

In this case, the polarizer unit 32A is attached to the radome portion of the bumper 30 thereby to add the same polarization transforming function as the one described above.

According to the constitution of FIG. 12, the position for attaching the polarizer unit 32A can be adjusted depending upon the position of the antenna 11 at the time of assembling the polarizer unit 32A, and the material of the polarizer unit 32A can be freely selected irrespective of the material of the bumper 30.

Embodiment 8.

In the above-mentioned embodiment 7, the polarizer unit 32A is attached to the bumper 30. It is, however, also allowable to form an opening 30B in the radome portion of the bumper 30, insert a separate polarizer unit in the opening 30B and to attach it integrally together.

Figure 13:
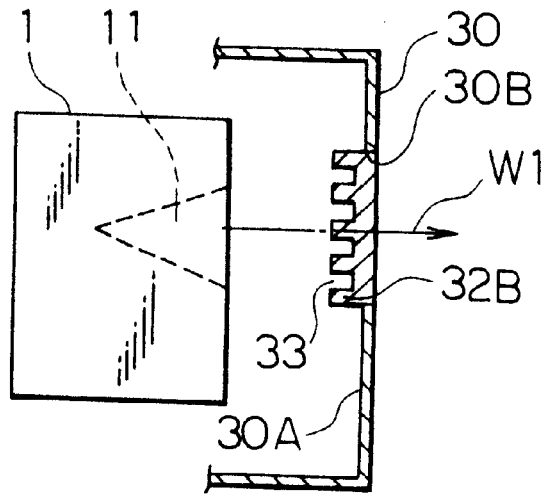
FIG. 13 is a side sectional view illustrating a major portion according to an embodiment 8 of the present invention.

FIG. 13 is a side sectional view illustrating a major portion of an embodiment 8 of the invention in which the separate polarizer unit is inserted in a portion of the bumper 30, and wherein the same portions as those mentioned above (see FIG. 12) are denoted by the same reference numerals but their description is not repeated.

In this case, an opening 30B is formed in the radome portion of the bumper 30, and a separate polarizer unit 32B is inserted in the opening 30B.

The polarizer unit 32B is attached to the bumper 30 integrally together through the opening 30B to accomplish the same polarization transforming function as the one described above.

According to the constitution of FIG. 13, the material of the polarizer unit 32B can be freely selected irrespective of the material of the bumper 30.

Moreover, since the polarizer unit 32B is formed quite irrespective of the material of the bumper 30, the polarization characteristics for the transmitted electromagnetic waves can be highly precisely adjusted.

The polarizer unit 32B is forming a plane in flush with the outer surface of the bumper 30. Upon applying any coating material on the outer side of the bumper 30, therefore, the polarizer unit 32B is not perceived from the outer side, and the appearance is not deteriorated.

Embodiment 9.

In the above-mentioned embodiment 1, the thickness tc of the bumper 30 is suitably selected to improve the electromagnetic wave transmission characteristics. It is, however, also allowable to apply a non-reflection coating onto the bumper 30 in order to improve the electromagnetic wave transmission characteristics.

Figure 14:
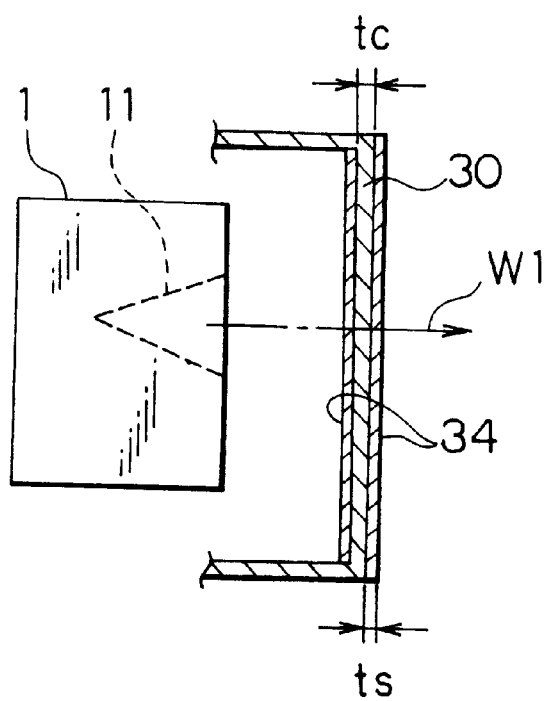
FIG. 14 is a side sectional view illustrating a major portion according to an embodiment 9 of the present invention.

FIG. 14 is a side sectional view illustrating a major portion of an embodiment 9 of the present invention in which the non-reflection coating is applied onto the bumper 30, and wherein the same portions as those described above (see FIG. 2) are denoted by the same reference numerals but their description is not repeated.

In this case, a coating material 34 that permits the electromagnetic waves to transmit through is applied to at least the radome portion of the bumper 30 maintaining a predetermined thickness ts, in order to impart the action of the non-reflecting coating for the electromagnetic waves that transmit through the bumper 30.

Though the coating material 34 is applied onto both the front surface and the back surface of the bumper 30, it may be applied to at least either the front surface or the back surface of the bumper 30.

The relative permittivity $\epsilon s$ of the coating material 34 is set to a value that satisfies the following formula (6), $$\epsilon c = \epsilon s^2 \qquad (6)$$

with respect to the relative permittivity $\epsilon c$ of the bumper 30.

Moreover, the thickness ts of the coating material 34 is set to a value which satisfies, for example, the following formula (7), $$ts = \{(2n-1)/4\} \cdot \lambda o / \sqrt{\epsilon s}$$

by using a natural number n, wavelength $\lambda o$ (=C/f) in free space, and relative permittivity $\epsilon c$ of the bumper 30.

The formula (7) is derived from, for example, thecontent disclosed in "Radome", Technical Report of Mitsubishi Denki Co., Vol. 29, No. 7 (July), by Takashi Kitsuregawa, p. 5.

As given by the formulas (6) and (7), the relative permittivity $\epsilon s$ of the coating material 34 on the bumper 30 and the thickness ts are suitably selected depending upon the relative permittivity $\epsilon c$ of the bumper 30, thickness ts thereof, and predetermined frequency f of the electromagnetic waves that are used, so that the coating material 34 works as a non-reflecting coating for the electromagnetic waves.

By applying the coating material 34 onto the radome portion of the bumper 30 as described above, a radome of a sandwich type of a one-fourth wavelength is constituted to improve transmission characteristics of the electromagnetic waves falling perpendicularly on the radome portion.

Embodiment 10.

In the above-mentioned embodiments 1 to 9, no attention is given to noise of the transmission beam W1 radiated from the antenna 11 and reflected by the back surface 30A of the bumper 30 or various kinds of external noise due to electromagnetic interference. However, it is allowable to apply an radiowave absorber onto the back surface 30A of the bumper 30 in order to suppress adverse effect caused by noise.

Figure 15:
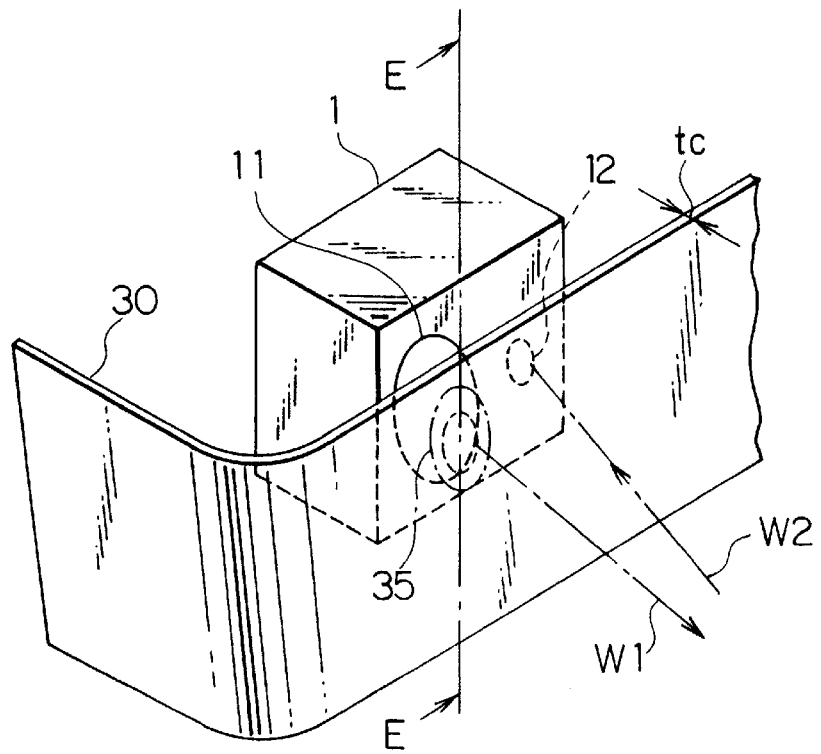
FIG. 15 is a perspective view illustrating a major portion according to an embodiment 10 of the present invention.
Figure 16:
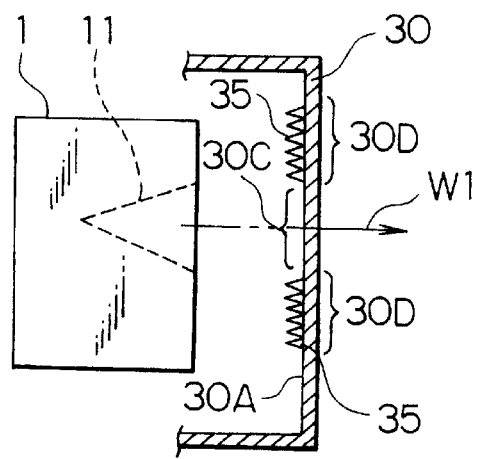
FIG. 16 is a side sectional view along the line E—E in FIG. 15.

FIG. 15 is a perspective view illustrating a major portion of an embodiment 10 of the invention in which the radiowave absorber is applied onto the back surface 30A of the bumper 30, and FIG. 16 is a side sectional view along the line E—E in FIG. 9.

In these drawings, the same portions as those mentioned above are denoted by the same reference numerals but their description is not repeated.

In this case, the bumper 30 includes a central portion 30C of the radome portion which is directly related to transmitting and receiving electromagnetic waves, and a peripheral portion 30D surrounding the central portion 30C.

Furthermore, the radiowave absorber 35 is applied onto the side of the back surface 30A of the peripheral portion 30D, i.e., onto the side facing the antenna 11 (or antenna 12) of the electromagnetic wave radar body 1. Here, a coating material comprising an radiowave absorbing material is used as the radiowave absorber 35.

As described above, the radiowave absorber 35 is applied to the back surface 30A of the peripheral portion 30D in order to decrease undesired interference waves such as noise due to the transmission beam W1 reflected by the back surface 30A of the bumper 30 and noise from the external side.

Therefore, the electromagnetic wave radar body 1 receives the beam W2 maintaining a high SN ratio to detect the target.

The peripheral portion 30D of the bumper 30 does not directly take part in the transmission and reception of the electromagnetic waves. Therefore, the function for transmitting and receiving the electromagnetic waves is not at all impaired despite the radiowave absorber 35 is applied to the back surface 30A of the peripheral portion 30D.

The radiowave absorber 35 can be easily applied onto the bumper 30 through a step of coating in order to easily accomplish the function for suppressing the radiation of undesired electromagnetic waves and the function for suppressing the electromagnetic interference.

I claim:

1. An electromagnetic wave radar device mounted on a vehicle comprising a bumper having a rear surface facing a body of said vehicle, said radar device comprising:

an electromagnetic wave radar body mounted on a vehicle for transmitting and receiving electromagnetic waves of a predetermined frequency; and a radome integrally formed in a portion of said bumper made of a dielectric material which permits the electromagnetic waves to transmit through the material;

said electromagnetic wave radar body being disposed behind the rear surface of the bumper of said vehicle so that said radome covers said electromagnetic wave radar body.

2. An electromagnetic wave radar device mounted on a vehicle according to claim 1, wherein a relative permittivity of said bumper is denoted by $\epsilon c$, an angle of incidence of the electromagnetic waves relative to said bumper is denoted by $\theta i$, a natural number by n, a wavelength of said electromagnetic waves in free space is denoted by $\lambda o$, and a thickness tc of the radome portion in said bumper is set to a value that satisfies the following formula, $$tc = n \cdot \lambda o / \left\{ 2\sqrt{(\varepsilon c - \sin^2 \theta i)} \right\}.$$

3. An electromagnetic wave radar device mounted on a vehicle according to claim 1, wherein the radome formed in said portion of said bumper comprises a dielectric lens portion for focusing said electromagnetic waves.

4. An electromagnetic wave radar device mounted on a vehicle according to claim 3, wherein said dielectric lens portion is formed by a thick portion in said bumper.

5. An electromagnetic wave radar device mounted on a vehicle according to claim 3, wherein said dielectric lens portion is secured to the rear surface of said bumper.

6. An electromagnetic wave radar device mounted on a vehicle according to claim 3, wherein said dielectric lens portion is disposed in an opening in said bumper.

7. An electromagnetic wave radar device mounted on a according to claim 1, wherein the radome formed in said portion said bumper comprises a polarizer unit with corrugated groves for transforming linear polarization and circular polarization relative to each other.

8. An electromagnetic wave radar device mounted on a vehicle according to claim 7, wherein a phase constant in a medium of said electromagnetic waves transmitting through said polarizer unit is denoted by $\beta m$, a phase constant of said electromagnetic waves in free space is denoted by $\beta o$, a natural number is denoted by n, and a depth d of said corrugated grooves is set to a value that satisfies the following formula, $$|\beta m - \beta o|d = (2n-1)\pi/2.$$

9. An electromagnetic wave radar device mounted on a vehicle according to claim 7, wherein said polarizer unit is integrally formed in said portion of said bumper.

10. An electromagnetic wave radar device mounted on a vehicle according to claim 7, wherein said polarizer unit is secured to the rear surface of said bumper.

11. An electromagnetic wave radar device mounted on a vehicle according to claim 7, wherein said polarizer unit is disposed in an opening in said bumper.

12. An electromagnetic wave radar device mounted on a vehicle according to claim 1, wherein the radome formed in said portion of said bumper is coated with a coating material in a predetermined thickness, said coating material being composed of a material which permits said electromagnetic waves to transmit through the coating material.

13. An electromagnetic wave radar device mounted on a vehicle according to claim 12, wherein said coating material is applied onto at least one of a front surface or a rear surface of the radome formed in said portion of said bumper and, wherein a relative permittivity of said bumper is denoted by $\epsilon c$ and a relative permittivity $\epsilon s$ of said coating material is set to a value that satisfies the following formula, $$\epsilon c = \epsilon s^2$$

and, wherein a natural number is denoted by n, a wavelength of the electromagnetic waves in free space is denoted by Xo, and a thickness ts of said coating material is set to a value that satisfies the following formula, $$ts = \{(2n-1)/4 \cdot \lambda o/\sqrt{\epsilon s}.$$

14. An electromagnetic wave radar device mounted on a vehicle according to claim 1, wherein the radome formed in said portion of said bumper has a central portion which is directly related to transmitting and receiving said electromagnetic waves, and a peripheral portion surrounding said central portion, said peripheral portion being coated with an radio wave absorber on a rear surface thereof that faces said electromagnetic wave radar body.

15. A vehicle comprising:

an electromagnetic wave radar body for transmitting and receiving electromagnetic waves of a predetermined frequency;

a bumper having a rear surface facing a body of said vehicle; and a radome integrally formed in a portion of said bumper made of a dielectric material which permits the electromagnetic waves to transmit through the material;

said electromagnetic wave radar boded being disposed behind the rear Surface of the bumper of said vehicle so that said radome covers said electromagnetic wave radar body.

* * * * *

UNITED STATES PATENT AND TRADEMARK OFFICE
CERTIFICATE OF CORRECTION

PATENT NO. : 6,496,138 B1
DATED : December 17, 2002
INVENTOR(S) : Shinichi Honma It is certified that error appears in the above-identified patent and that said Letters Patent is hereby corrected as shown below:

Column 12,
Line 9, delete "Xo" and insert -- $\lambda o$ --.

Line 13, delete "ts={(2n-1)/4·$\lambda$o/ $\sqrt{\varepsilon s}$" and insert -- ts={(2n-1)/4}·$\lambda$o/ $\sqrt{\varepsilon s}$ --

Signed and Sealed this

Twenty-fourth Day of June, 2003

JAMES E. ROGAN
*Director of the United States Patent and Trademark Office*